(12) United States Patent
Makos

(10) Patent No.: US 11,944,082 B2
(45) Date of Patent: Apr. 2, 2024

(54) TIP-UP COVER

(71) Applicant: Pure Fishing, Inc., Spirit Lake, IA (US)

(72) Inventor: Timothy S. Makos, Grafton, WI (US)

(73) Assignee: Pure Fishing, Inc., Spirit Lake, IA (US)

(*) Notice: Subject to any disclaimer, the term of this patent is extended or adjusted under 35 U.S.C. 154(b) by 0 days.

(21) Appl. No.: 17/929,878

(22) Filed: Sep. 6, 2022

(65) Prior Publication Data

US 2023/0070991 A1    Mar. 9, 2023

Related U.S. Application Data

(60) Provisional application No. 63/242,242, filed on Sep. 9, 2021.

(51) Int. Cl.
| | | |
|---|---|---|
| A01K 97/01 | (2006.01) | |
| A01K 91/02 | (2006.01) | |
| A01K 97/06 | (2006.01) | |
| A01K 97/12 | (2006.01) | |

(52) U.S. Cl.
CPC .............. *A01K 91/02* (2013.01); *A01K 97/01* (2013.01); *A01K 97/06* (2013.01); *A01K 97/125* (2013.01)

(58) Field of Classification Search
CPC ................................ A01K 97/01; A01K 97/12
See application file for complete search history.

(56) References Cited

U.S. PATENT DOCUMENTS

| | | | | |
|---|---|---|---|---|
| 3,745,689 | A * | 7/1973 | Williams | A01K 97/12 43/17 |
| 10,524,460 | B1 * | 1/2020 | Konitzer | A01K 97/12 |
| 2013/0227873 | A1 * | 9/2013 | Coulson | A01K 97/12 |
| 2014/0157651 | A1 * | 6/2014 | Trout | A01K 97/12 |
| 2020/0375167 | A1 * | 12/2020 | West | A01K 97/12 |

OTHER PUBLICATIONS https://www.boxtipups.com/, Aug. 31, 2022.

* cited by examiner

*Primary Examiner* — Joshua J Michener
*Assistant Examiner* — Henry Hooper Mudd
(74) *Attorney, Agent, or Firm* — Husch Blackwell LLP

(57) ABSTRACT

A tip-up cover is provided that may be used during ice fishing. The tip-up cover may be set over a hole made in the ice during ice fishing to protect the hole from wind and snow. The tip-up cover may include a transparent lid such that a user can view the interior of the tip-up cover without opening the cover. Also, the lid allows a user to adjust a spool within the tip-up cover without requiring the user to completely remove the cover from the ice hole. Finally, the tip-up cover includes a flag and a bite-indicator light that provide visual cues to the user when a fish is caught on the line attached to the spool.

12 Claims, 6 Drawing Sheets

TIP-UP COVER

CROSS-REFERENCE TO RELATED APPLICATIONS

This application claims priority to U.S. Provisional Patent Application Ser. No. 63/242,242, filed on Sep. 9, 2021, entitled "TIP-UP COVER," the entire disclosure of which is hereby incorporated herein by reference.

FIELD OF INVENTION

The present invention relates generally to line setters used when fishing, and more particularly to covers used during ice fishing that enable an angler to fish multiple lines without having to individually tend the lines.

BACKGROUND OF INVENTION

Ice fishing is a pastime enjoyed by many people throughout the world. In addition, for many people in northern climates, ice fishing is steeped in tradition and is an integral part of their culture. Ice fishing may be carried out on frozen ponds, lakes, or rivers. To begin fishing, an angler will first cut a hole through the ice to access liquid water underneath the frozen surface. After the hole is made in the ice, the angler may lower a fishing line through the hole and into the water so that he or she can catch fish. The angler may use known methods to fish at different depths from the ice hole. Because of the effort involved in cutting through the ice, an angler will often fish from the same hole for several hours, days, or even weeks. In addition, the angler may cut several holes near one another such that he or she can fish from multiple nearby locations.

As outlined above, ice fishers face unique challenges when fishing; as such, ice-hole covers have been developed to assist them. The hole covers may allow for ice fishers to cover the ice hole while also allowing them to fish from the hole. However, existing hole covers present many issues for their users that may greatly inconvenience them. First, existing hole covers may allow for wind and snow to penetrate the cover, which can cause the ice hole to freeze shut. Second, existing covers are typically opaque, which forces the users to lift the entire cover from the ice hole to see into the hole. Finally, existing covers do not have a mechanism that signals the users when they have caught a fish on a fishing line associated with the cover.

SUMMARY OF INVENTION

The present invention overcomes many of the shortcomings and limitations of the prior art devices discussed above. The invention described includes several embodiments of a tip-up cover which may cover an ice hole made during ice fishing. The tip-up cover may be variously sized for different types of ice fishing; for example, in one embodiment, the tip-up cover may be sized to cover a ten-inch hole.

The invention has several advantages over the prior art. First, the tip-up cover may help prevent the ice hole from freezing shut. When placed over the ice hole, the tip-up cover may prevent snow and/or wind from entering the ice hole. This may help prevent the water located within the hole from freezing and thereby protecting the hole from the elements.

Also, the tip-up cover may include a lid that, when opened, may allow the user to access the interior of the tip-up cover. Thus, the lid may allow the user to adjust a line depth of a fishing line associated with the cover without removing the tip-up cover from the ice hole. Again, this may help protect the ice hole from wind and/or snow.

Further, the tip-up cover may include a built-in aerator. The aerator may provide air (or in alternative embodiments where the aerator is a pump, water) to the water (for example, in the form of bubbles or water jets/streams) that may cause the water in the ice hole to move. By keeping the water in motion, the aerator may help prevent the water from freezing and sealing the hole shut. As an added benefit, the air bubbles may help prevent the fishing line from freezing to a surface of the ice hole.

The tip-up cover may provide additional visual information to the user that improves the ice-fishing experience. For example, the tip-up cover may include a flag to inform the user when the user has a fish on the line. The flag may be tripped and extend upwardly from the tip-up cover after a fish bites the line associated with the tip-up cover. When the fish bites the line, additional line may be drawn from the spool, causing the spool to rotate. When the spool rotates more than a predetermined amount, a trip bar attached to the spool may be released. In turn, the flag may move from a substantially horizontal position into a substantially vertical position. Further, the tripping of the flag may activate a bite-indicator light, providing the user with another visual cue that the user has a bite and/or fish on the line.

The tip-up cover may also help prevent a hook attached to the line from becoming tangled with other lines or hooks. This may be particularly important when the tip-up cover is being stored (e.g. in a tackle box, in an ice fishing shelter, or on an ATV or snowmobile gear rack). To help prevent the hook from becoming entangled with other items, the tip-up cover may include hook retainers. The hook retainers may be affixed to a base of the tip-up cover. The hook retainers may allow the user to fasten the fishing hook to the base and then lock the spool in place.

The tip-up cover may help the user catch more fish than prior art covers. The tip-up cover may include a horizontal spool that offers less drag and more sensitivity when compared to a traditional vertical spool. Further, the horizontal spool allows for the line to come straight off the spool like a bait casting reel or winch. In contrast, if the spool was vertically mounted, the line would come off the spool like a spinning reel.

These and other aspects and advantages of the present invention will become apparent to those skilled in the art after considering the following detailed description in connection with the accompanying drawings.

Figure 1:
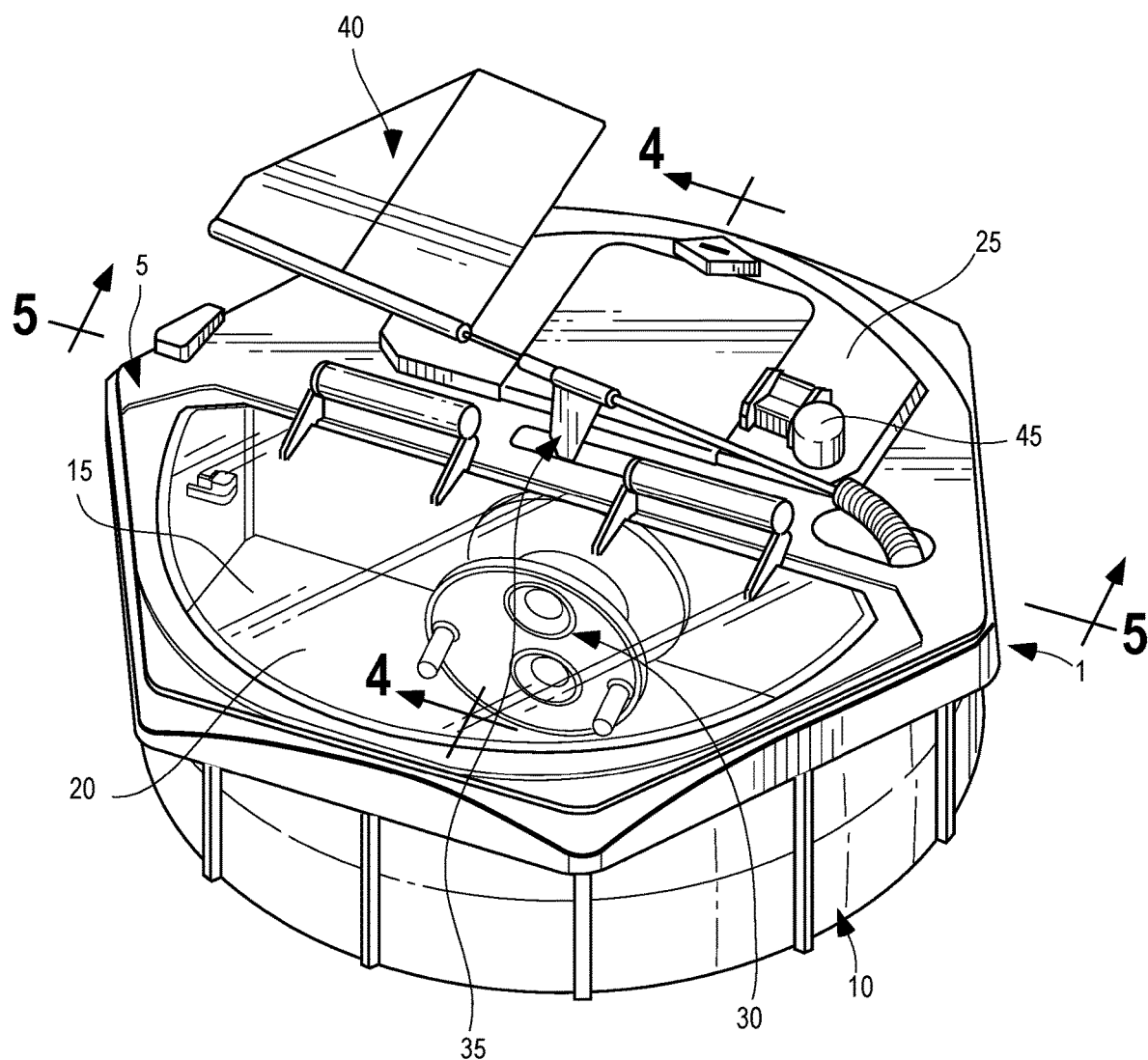
FIG. 1 is a top isometric view of a tip-up cover in a set position, the tip-up cover constructed according to the teachings of the present invention.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. As would be understood by a person having skill in the art, the invention may be used in association with objects that are not illustrated in the figures, including a fishing line, a fishing hook, and an ice hole.

As illustrated in FIG. 1, a tip-up cover 1 is in a set position such that it is ready to use for ice fishing. The tip-up cover 1 may be placed over an ice hole that an angler has created and wishes to fish from. To help cover the ice hole, the tip-up cover 1 may include a top portion 5 that is preferably permanently mounted to a base 10, although in other embodiments the top portion 5 may be releasably or semi-permanently mounted to the base 10. The top portion 5 may have a lid 15 that is hingedly attached to the top portion 5. The lid 15 may be placed in a closed position (as illustrated in FIG. 1) or in an open position. Preferably, the lid 15 is composed of a transparent material (e.g. plastic) such that a user can see through a first aperture 20 provided in the top portion 5. That way, the user may peer into an interior of the tip-up cover 1 and the hole below the cover 1. In other embodiments, the lid 15 may be opaque.

The tip-up cover 1 may include an aerator 25 that helps prevent the ice hole from freezing shut. The aerator 25 may use known mechanical principles to pump air into the water located in the ice hole and below the cover 1 such that the water is preferably in continuous motion. The water's movement, effectuated by the aerator 25, may supply the water with enough kinetic energy to prevent the water from freezing (and thereby prevent the water from sealing the ice hole).

In addition, the tip-up cover 1 may indicate to the user when the user has caught a fish. When a fish is caught on a fishing line, additional line may release from a spool 30 as the fish swims away from the ice hole. The spool 30 may be positioned inside the first aperture 20 beneath the lid 15. The spool 30 may be provided in the form of a cylinder, although other shapes for the spool 30 are foreseeable. Specifically, as line (not illustrated) releases from the spool 30, the spool 30 may rotate. The spool 30 may be in mechanical connection with a trip bar 35 such that when the spool 30 rotates more than a predetermined amount, the trip bar 35 may be released. When the trip bar 35 is released, a flag 40 may also be released from a first, retracted position, as illustrated, and into a substantially vertical position. As the flag 40 moves upwards and away from the top portion 5, a light 45 may also be mechanically or electronically configured to activate. The flag 40 in the vertical position and/or the brightness of the light 45 may provide a visual cue or signal to the user that there is a fish on the line.

Advantageously, because of the aforementioned indicators (i.e. the flag 40 and the light 45), the tip-up cover 1 may allow for the user to fish from several ice holes at once, as the user can easily see when she has caught a fish in a particular ice hole. Further, in alternative embodiments of the invention, the aforementioned indicators may be positioned in several locations, including on at least one of the top portion 5, the base 10, and the aerator 25.

Figure 2:
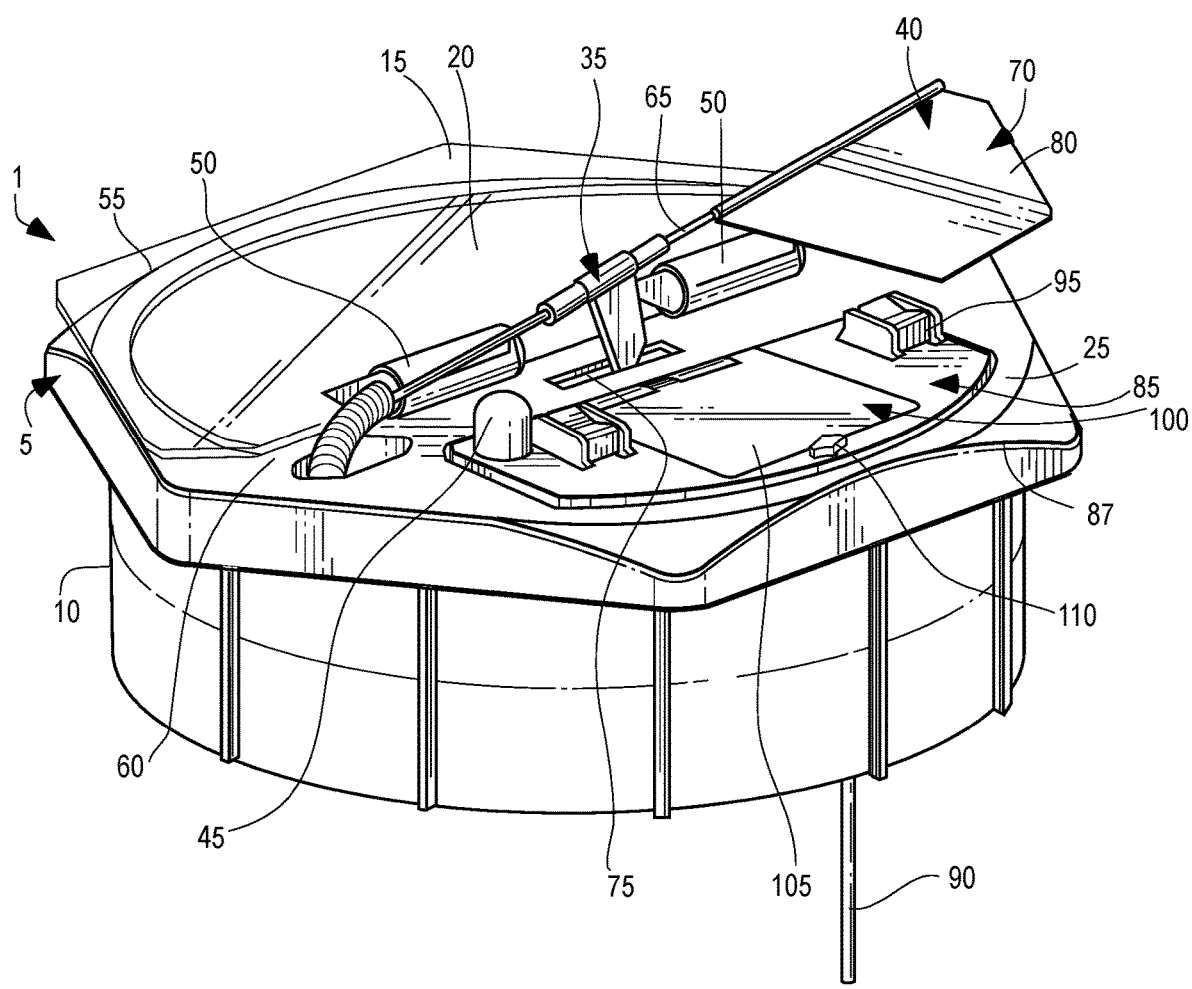
FIG. 2 is a top isometric view of the tip-up cover of FIG. 1, further illustrating an air hose extending downwardly from an aerator of the tip-up cover.

Turning to FIG. 2, the base 10 may generally be an open cylinder with sidewalls extending generally downwardly away from the top portion 5, although other shapes are foreseeable. The top portion 5 may be substantially the same size as, or slightly larger than, the base 10. The top portion 5 may be affixed to the base 10 via glue, snap mechanisms, or other attachment methods as would be appreciated by those skilled in the art. The lid 15 may be attached to the top portion 5 by one or more hinges 50, although other rotatable or even detachable attachment mechanisms are foreseeable.

The lid 15 may be sized and positioned such that it at least partially, and preferably completely, overlays the first aperture 20 when in the closed position. In the illustrated embodiment, the first aperture 20 extends from a first side 55 of the top portion 5 to a center segment 60 of the top portion 5. In other embodiments of the invention, the first aperture 20 may be differently sized and positioned within the top portion 5.

The flag 40 may be composed of a flag shaft 65 and a flag topper 70. The flag shaft 65 may be an elongated structure that is affixed to the top portion 5. The flag topper 70 may be affixed to an end of the flag shaft 65 such that the flag topper 70 extends away from the tip-up cover 1 when the trip bar 35 is released. The trip bar 35 may be affixed to the flag shaft 65 and positioned such that the trip bar 35 also extends downwardly into a slot 75. The slot 75 may extend through the top portion 5 such that the trip bar 35 may be placed in mechanical communication with the spool 30 (not illustrated). More particularly, the trip bar 35 may hold the flag 40 in the first position until a fish bites the line associated with the tip-up cover 1 (as described below in greater detail with respect to FIG. 5). When the line is taken by a fish, the trip bar 35 may allow the flag shaft 65, and thus the flag topper 70, to rotate upwards and away from the tip-up cover 1.

The flag topper 70 may further include a reflective strip 80. The reflective strip 80 may reflect light such that the flag 40 is easier to see from a distance. Preferably, the reflective strip 80 may reflect light generated by the light 45 when a fish has been hooked on the line. The light 45 may be in electrical communication with a power source (not illustrated) such that it may draw electricity from the power source when activated. The light 45 preferably is an LED bulb, although other bulbs may be used as would be appreciated by those skilled in the art.

The aerator 25 may be contained in a second aperture 85 that is positioned at a second side 87 of the top portion 5, opposite the first aperture 20. The second aperture 85 may be substantially the same size as, or somewhat smaller than, the first aperture 20. In alternative embodiments, the second aperture 85 may be larger than the first aperture 20. In other embodiments, the second aperture 85 may be significantly smaller than the first aperture 20. Preferably, the second aperture 85 is sized such that the aerator 25 may be inserted into the second aperture 85 and secured via a friction fit or other means as would be appreciated by those skilled in the art.

When the tip-up cover 1 is positioned over an ice hole, an air hose 90 may extend downwardly from the aerator 25 and into the ice hole. The air hose 90 may be affixed to a bottom surface of the aerator 25 such that air from the aerator 25 may be pumped into water within the ice hole to help prevent the ice hole from sealing shut. By keeping the water in the ice hole in motion, the air pumped through the air hose 90 may help prevent the line associated with the tip-up cover 1 from becoming encased in ice along a surface of the ice hole.

The aerator 25 may be turned on and off by an aerator switch 95. The user may toggle the switch 95 between on and off positions to control the aerator 25. Thus, the switch 95 may allow the user to turn off the aerator 25 when not in use, when moving the tip-up cover 1, when storing the tip-up cover 1, or when conserving the power source (not illustrated) of the tip-up cover 1. The switch 95 may be positioned on a top surface of the aerator 25, although in other embodiments of the invention, the switch 95 may be positioned elsewhere on the tip-up cover 1.

The power source of the tip-up cover 1 may be housed within a compartment 100. The power source may provide electricity to the various electrical components of the tip-up cover 1. The power source may be a single battery or multiple batteries located within the compartment 100. Further, the battery or batteries may be single-use (e.g. alkaline) or rechargeable (e.g. lithium ion). In the illustrated embodiment, the compartment 100 is housed within the aerator 25, although in other embodiments of the invention the compartment 100 may be housed within the first aperture 20 or outside of the base 10. The compartment 100 may be accessed by opening a compartment lid 105. The compartment lid 105 may be secured by a thumb screw 110, although other securing means would be appreciated by those skilled in the art.

Figure 3:
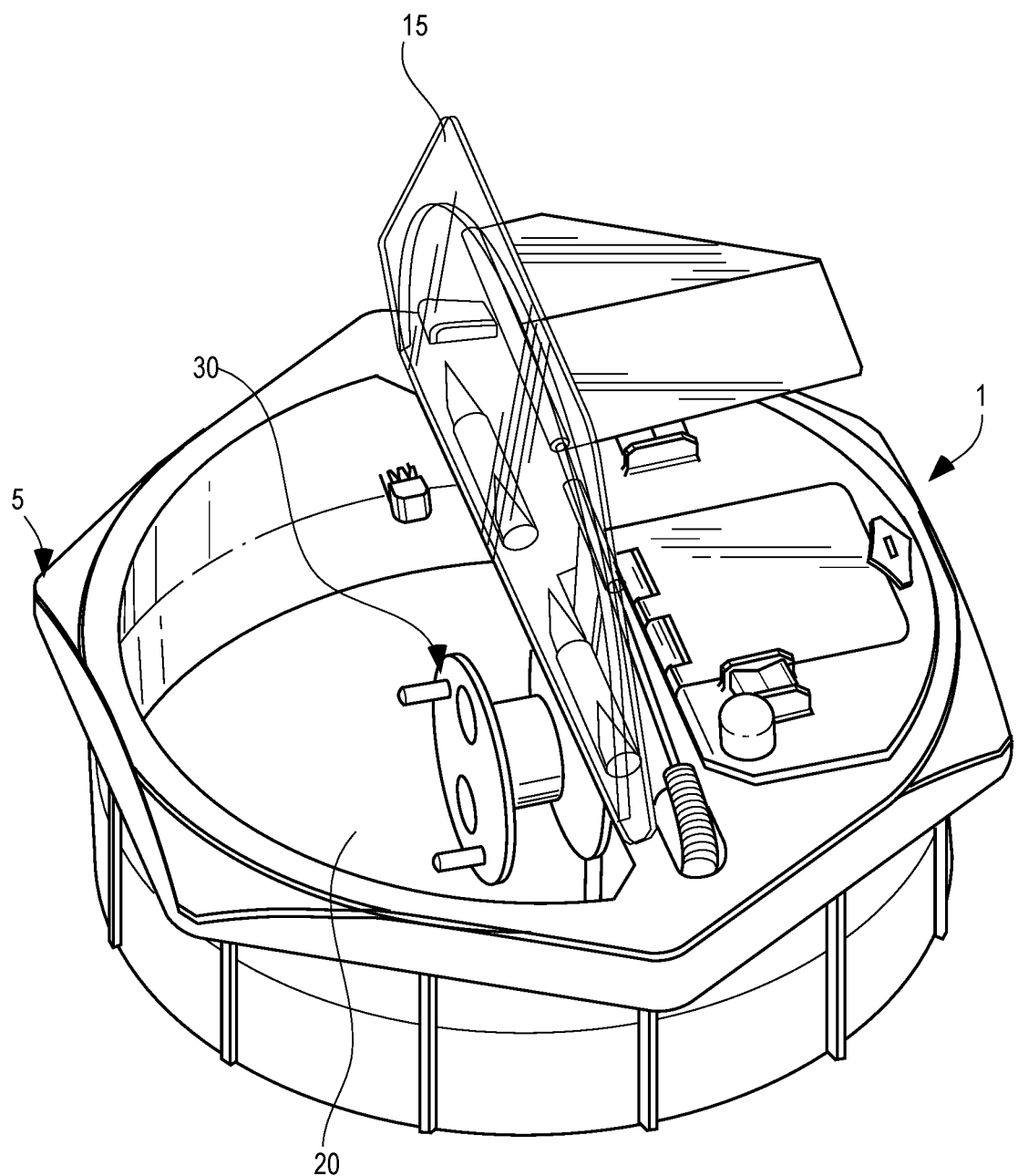
FIG. 3 is a top isometric view of the tip-up cover of FIG. 1, with a lid of the tip-up cover in an open position.

Turning to FIG. 3, the lid 15 is illustrated in the open position. To open the lid 15, the user may grip the lid 15 and lift the lid 15 upwardly and away from the top portion 5. Once the lid 15 is open, the user may access various components of the tip-up cover 1 through the first aperture 20, including the spool 30. For example, by opening the lid 15 the user may access the spool 30 without lifting the tip-up cover 1 away from the ice hole. Thus, the lid 15 may allow the user to adjust the depth of the line associated with the spool 30 without lifting the tip-up cover 1 away from the ice hole.

Figure 4:
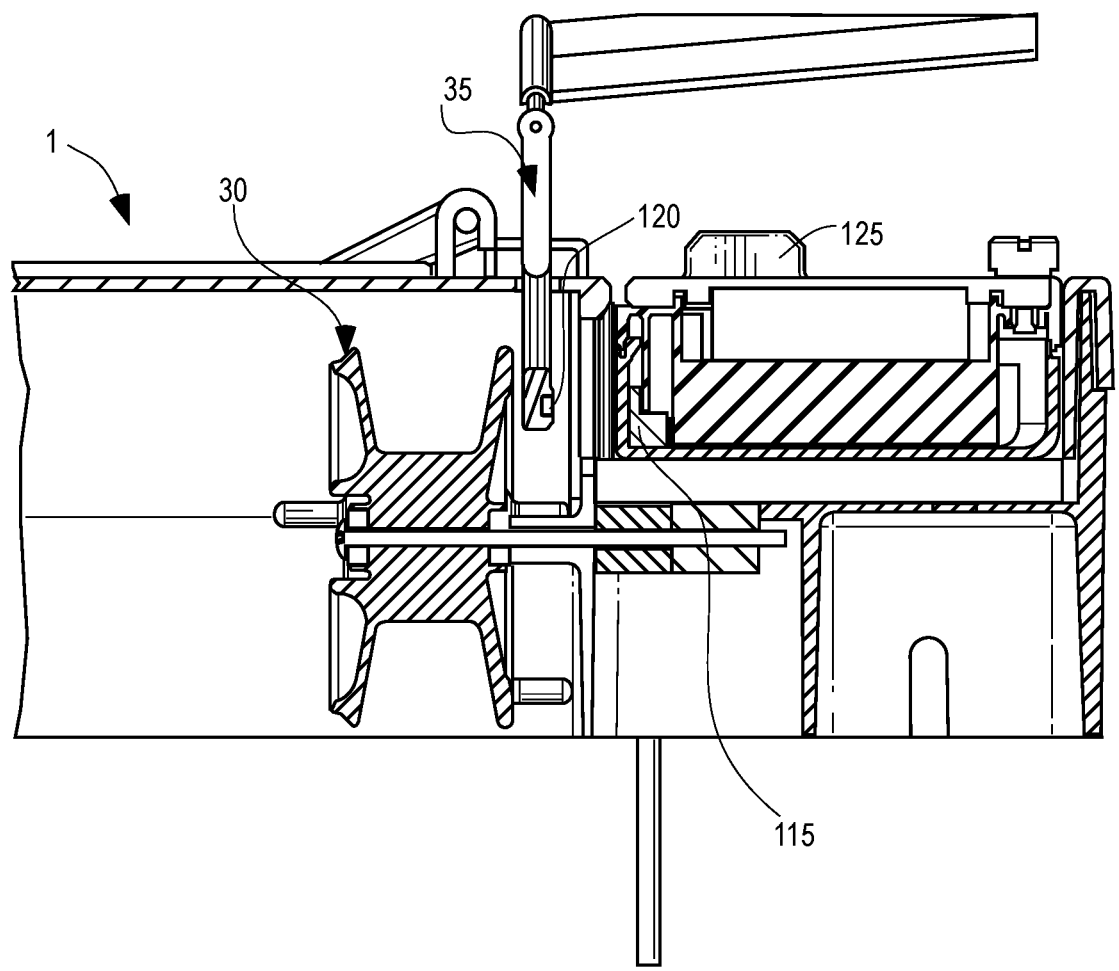
FIG. 4 is a cross-sectional view of the tip-up cover of FIG. 1.

As illustrated in FIG. 4, the tip-up cover 1 may include a magnetic sensor 115 and a magnet 120. The sensor 115 may be configured to detect a magnetic field that emanates from the magnet 120. The magnet 120 may be housed within the trip bar 35, such that when the trip bar 35 is released from the spool 30, the light 45 (see FIG. 1) is activated. More particularly, when a fish is caught on the line associated with the tip-up cover 1, the spool 30 may begin to rotate. Once the spool 30 rotates a predetermined amount in a particular direction (e.g. a counterclockwise direction), the trip bar 35 may be released from the spool 30. After release, the trip bar 35 may move upwardly and away from the spool 30. Once the trip bar 35 moves a predetermined distance upwardly and away from the spool 30, the strength of the magnetic field generated by the magnet 120 and detected by the sensor 115 may drop below a threshold value. When this occurs, the sensor 115 may send a signal to control the light 45 through electrical or mechanical means, as would be appreciated by those skilled in the art. When the light 45 receives the signal from the sensor 115, the light 45 may activate, which may alert the user that a fish is on the line. In alternative embodiments of the tip-up cover 1, the magnetic sensor 115 may also activate an audible indicator such as a speaker or a buzzer to alert the user that a fish is on the line.

The sensor 115 may be operated by an indicator switch 125 positioned on the top surface of the aerator 25. In other embodiments, the switch 125 may be positioned elsewhere on the tip-up cover 1. In a preferred embodiment, the sensor 115 may be activated and deactivated by the switch 125. When the switch 125 is in the off position, the sensor 115 may not operate (i.e., the sensor 115 may not detect changes in the magnetic field); thus, the sensor 115 may not send a signal to the light 45 regardless of the location of the magnet 120. In contrast, if the switch 125 is in the on position, the sensor 115 may function as previously described. Thus, the switch 125 may determine whether the light 45 is activated when a fish is caught on the line associated with the tip-up cover 1. In other embodiments of the invention, the tip-up cover 1 may not have a switch 125; in these embodiments, the sensor 115 may always operate to detect the strength of the magnetic field from the magnet 120. In other alternative embodiments, the switch 125 may directly disable power to the light 45 or other indicators (i.e. the switch 125 may disable the light 45 from illuminating irrespective of the signal from the magnetic sensor 115). Thus, using alternative methods, the switch 125 may still determine whether the light 45 is activated when a fish is caught on the line associated with the tip-up cover 1.

Figure 5:
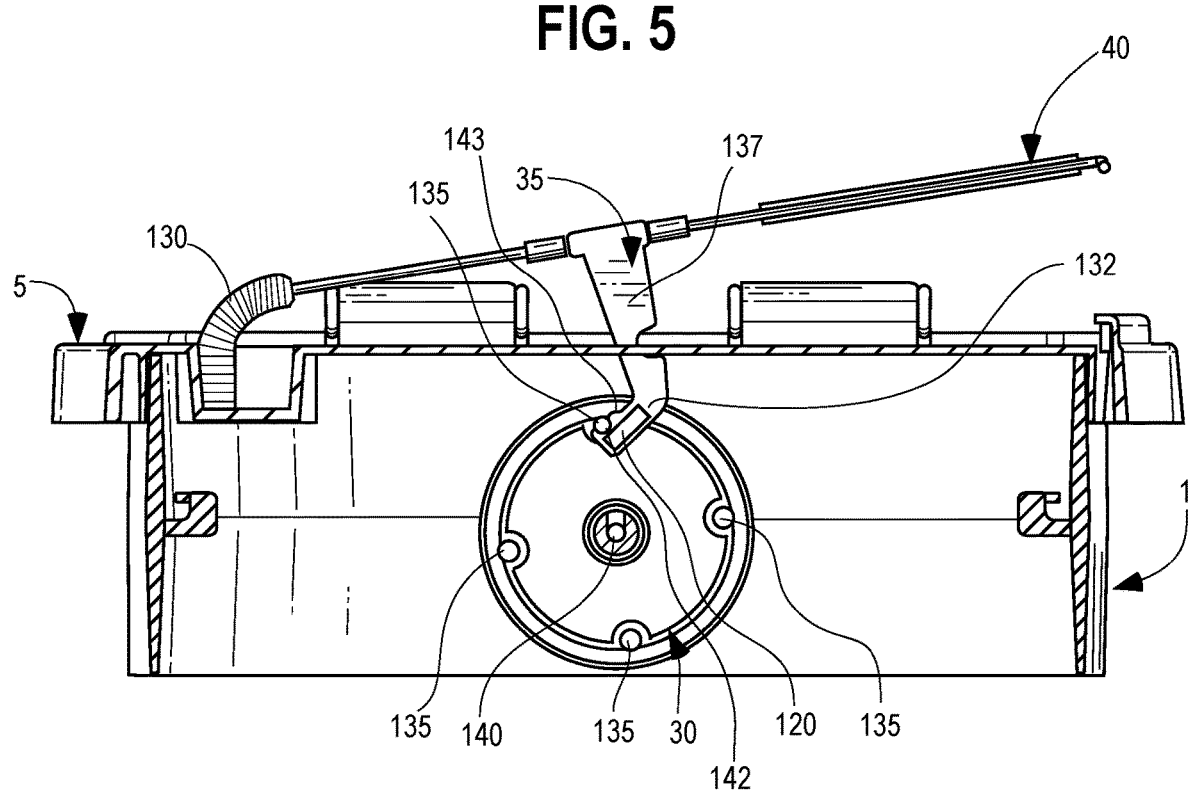
FIG. 5 is a cross-sectional view of the tip-up cover of FIG. 1, the tip-up cover in the set position as it would be placed during fishing.

FIG. 5 illustrates the tip-up cover 1 in the set position. In the set position, the tip-up cover 1 is ready to be triggered by a fish bite. In the set position, the flag 40 is at a small acute angle above the top portion 5. The user may place the tip-up cover 1 in the set position by applying a downward force to the flag 40. The downward force applied by the user may cause a spring 130 (which is affixed to the flag shaft 65 of FIG. 6 and the top portion 5) to bend, which in turn may allow the flag 40 to move in a downwards direction. When bent, the spring 130 may store potential energy that may allow the flag 40 to move into the vertical position after the trip bar 35 is released.

To place the tip-up cover 1 in the set position, the user may position a foot 132 of the trip bar 35 below a spool post 135. The spool post 135 may extend outwardly from the spool 30 such that the foot 132 can be positioned below the spool post 135. The foot 132 may be an angled portion that protrudes at an acute angle from a body 137 of the trip bar 35. As the user pushes downward on the flag 40 to set the tip-up cover 1, the user may also position the foot 132 such that it abuts a bottom portion of the spool post 135. In this position, the spool post 135 prevents the upward motion of the foot 132, and thus the upward motion of the trip bar 35. More particularly, an upward bias of the trip bar 35 (facilitated by the spring 130) may hold the foot 132 in place against the spool post 135. In alternative embodiments of the invention, the spool post 135 may be constructed of a magnetic material such that the force of attraction between the magnet 120 and the spool post 135 holds the trip bar 35 in place when the trip bar 35 is set.

In the illustrated embodiment, the spool 30 includes four spool posts 135, although a different number of spool posts 135 may be affixed to the spool 30 as would be appreciated by those skilled in the art. The spool posts 135, in conjunction with the rotation of the spool 30, may set the depth of the line. The user may rotate the spool 30 in one direction (e.g. a counterclockwise direction), releasing additional line from the spool 30 and increasing the depth of the line until the user affixes the trip bar 35 to one spool post 135. When a fish bites bait attached to the line, the fish may tug on the line, which may cause the spool 30 to rotate on a spool shaft 140. When the fishing line is pulled such that the spool 30 rotates (in the example embodiment in a counterclockwise direction), the spool post 135 similarly rotates. As the spool post 135 rotates, it may rotate away from the foot 132 of the trip bar 35 such that it no longer retains the trip bar 35 in place. The spring 130 may then exert a force on the trip bar 35 to raise the flag 40.

The trip bar 35 may feature two different stiffness settings. The two different stiffness settings may be a first groove 142 and a second groove 143 located in the foot 132 of the trip bar 35. When using the tip-up cover 1, the user may place the spool post 135 in either the first groove 142 or the second groove 143. The first groove 142 and the second groove 143 may be sized and shaped differently. Depending on its size and shape, the first groove 142 may generate more or less resistance to rotation of the spool 30 than the second groove 143. Thereby, the user may select the appropriate stiffness setting, based on the size of the bait attached to the hook, to help prevent the flag 40 from moving into the vertical position before a fish bites the bait.

The spool 30 of the tip-up cover 1 may be arranged in a horizontal configuration. Advantageously, arranging the spool 30 horizontally may allow the spool 30 to have less drag and more sensitivity than vertically aligned spools. Moreover, the horizontal spool 30 may allow for the line to come straight off the spool 30 like a bait casting reel or winch. In yet other embodiments, the spool 30 may be arranged on the tip-up cover 1 in a vertical position or another position as would be appreciated by those skilled in the art.

Figure 6:
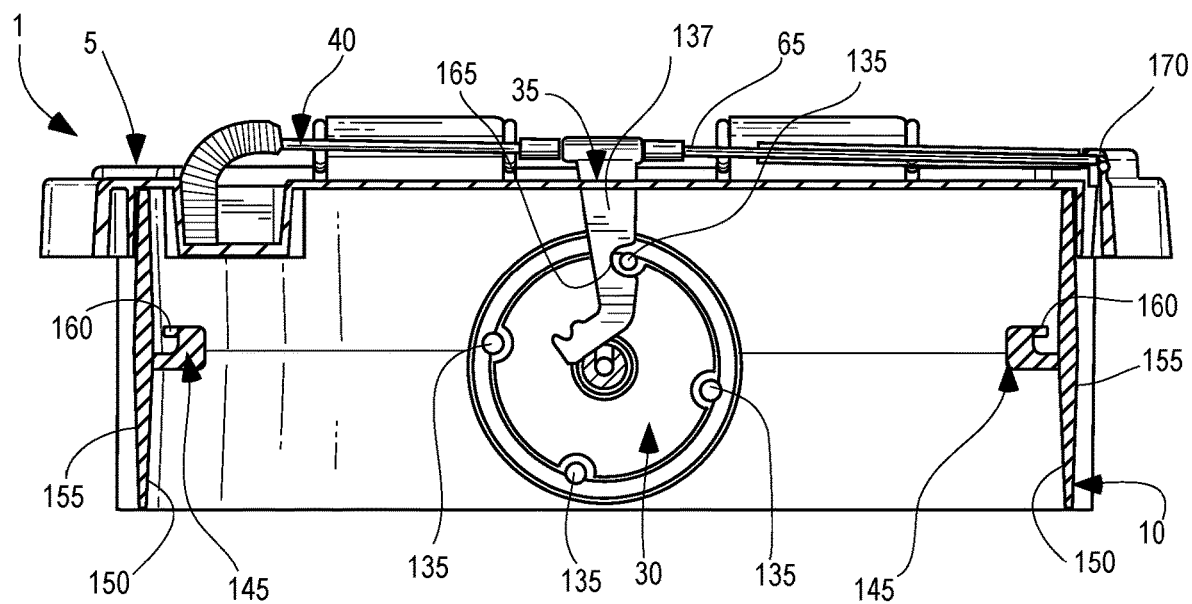
FIG. 6 is a view of the tip-up cover of FIG. 5, the tip-up cover in a storage configuration.

Turning to FIG. 6, the tip-up cover 1 is illustrated in a configuration that may allow for convenient storage of the tip-up cover 1. The tip-up cover 1 may include one or more hook retainers 145 that help the user conveniently store the tip-up cover 1. The hook retainers 145 may be permanently or semi-permanently affixed to an interior side surface 150 of the base 10. The hook retainers 145 may be affixed to opposite ends 155 of the interior side surface 150, although other positions for the hook retainers 145 would be appreciated by those skilled in the art. A curved arm portion 160 of the hook retainer 145 may curl inwardly towards the interior side surface 150. The curved arm portion 160 may allow the hook to be retained within the hook retainer 145 when the hook is received therein and the line from the spool 30 is pulled taut. Advantageously, affixing the hook to the hook retainers 145 may prevent the hook from becoming entangled with other portions of the tip-up cover 1, or with the line extending from the spool 30, or with other items near the tip-up cover 1 as the tip-up cover 1 is stored.

Once the hook is placed on one hook retainer 145, and the spool 30 is rotated until the fishing line is taut, the flag shaft 65 may be placed into a substantially horizontal position. To hold the flag 40 in the horizontal position, one of the spool posts 135 may be inserted into a notch 165 in the trip bar 35. The notch 165 may be a semioval-shaped recess in a body 137 of the trip bar 35. Further, the notch 165 may be the same size as, or somewhat larger, than the spool posts 135 such that the spool posts 135 may be received therein. In addition, the notch 165 may be positioned such that when one spool post 135 is received within, upwards motion of the trip bar 35 (and the flag 40) is prevented. Finally, the flag shaft 65 may also be inserted into a pocket 175 of the top portion 5. The pocket 175 may help further secure the flag 40 in the substantially horizontal position and help protect the flag 40 during storage of the tip-up cover 1.

As is evident from the foregoing description, certain aspects of the present invention are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

The invention claimed is:

1. A cover that overlays an ice hole during fishing, the cover comprising:
   a base;
   a top portion coupled to the base, the top portion further including a first aperture positioned and located at a first end of the top portion;
   at least one indicator affixed to at least one of the top portion and the base;
   a spool retained within an interior of the base and accessible through the first aperture,
   wherein the at least one indicator is activated by rotation of the spool; and
   an aerator retained within the cover, the aerator adapted to pump air into the ice hole.

2. The cover of claim 1, wherein a first indicator of the at least one indicator is activated via a magnet in mechanical communication with the spool and a magnetic sensor in electrical communication with the indicator.

3. The cover of claim 1, the cover further comprising a lid coupled to the top portion, and wherein when the lid is in a closed position, the lid prevents access to the first aperture.

4. The cover of claim 1, wherein the at least one indicator includes two or more indicators.

5. The cover of claim 1, the cover further comprising a lid, and wherein a body of the lid is substantially transparent.

6. A cover comprising:
   a body;
   a cylinder coupled to the body, the cylinder adapted for affixing a first end of a fishing line to the cover;
   at least one indicator positioned and located on the body;
   a trip bar with a first position and a second position, wherein in the first position, the trip bar is coupled to the cylinder and the at least one indicator is not activated, and wherein in the second position, the trip bar is decoupled from the cylinder and the at least one indicator is activated; and
   an aerator retained within the cover, the aerator adapted to pump air into the ice hole.

7. The cover of claim 6, the cover further comprising:
   At least one hook retainer coupled to the body, the at least one hook retainer configured for selectively attaching a second end of the fishing line to the cover when the cover is not in use.

8. The cover of claim 6, wherein the at least one indicator comprises at least one of a light, a flag, and an audible indicator.

9. The cover of claim 6, wherein the at least one indicator comprises a flag, and wherein the flag is substantially vertical when in an indicating position.

10. The cover of claim 9, wherein the flag can be locked into a substantially horizontal position when the cover is not in use.

11. The cover of claim 6, wherein the at least one indicator comprises a flag, and wherein the flag is spring-loaded such that a spring causes the flag to rotate to a vertical position when the indicator is activated.

12. The cover of claim 6, wherein the at least one indicator comprises a flag coupled to the trip bar.

\* \* \* \* \*